US010419282B1

(12) United States Patent
Cosgrove

(10) Patent No.: US 10,419,282 B1
(45) Date of Patent: Sep. 17, 2019

(54) SELF-CONFIGURING NETWORK DEVICES

(71) Applicant: Amazon Technologies, Inc., Seattle, WA (US)

(72) Inventor: Timothy Fredrick Cosgrove, Bellevue, WA (US)

(73) Assignee: Amazon Technologies, Inc., Seattle, WA (US)

( * ) Notice: Subject to any disclaimer, the term of this patent is extended or adjusted under 35 U.S.C. 154(b) by 746 days.

(21) Appl. No.: 14/864,721

(22) Filed: Sep. 24, 2015

(51) Int. Cl.
*H04L 12/24* (2006.01)
*H04L 12/775* (2013.01)

(52) U.S. Cl.
CPC ........ *H04L 41/0806* (2013.01); *H04L 41/083* (2013.01); *H04L 45/58* (2013.01)

(58) Field of Classification Search
None
See application file for complete search history.

(56) References Cited

U.S. PATENT DOCUMENTS

| | | | |
|---|---|---|---|
| 7,403,530 B2 | 7/2008 | Deplaix | |
| 7,756,017 B2 | 7/2010 | Goyal | |
| 7,836,295 B2 | 11/2010 | Chari | |
| 7,933,198 B1 * | 4/2011 | Pan | H04L 45/586 370/216 |
| 2001/0043602 A1 | 11/2001 | Brown | |
| 2002/0060986 A1 | 5/2002 | Fukushima | |
| 2002/0087688 A1 * | 7/2002 | Kamentsky | H04L 29/06 709/225 |
| 2002/0133593 A1 * | 9/2002 | Johnson | G06Q 10/10 709/226 |
| 2003/0009585 A1 | 1/2003 | Antoine | |
| 2003/0021232 A1 | 1/2003 | Duplaix | |
| 2003/0079216 A1 | 4/2003 | Drane | |
| 2004/0019781 A1 | 1/2004 | Chari | |
| 2004/0100904 A1 | 5/2004 | Chander | |
| 2005/0220109 A1 | 10/2005 | Sudo | |
| 2007/0197228 A1 | 8/2007 | McGary | |
| 2007/0204275 A1 | 8/2007 | Alshab | |
| 2007/0274230 A1 | 11/2007 | Werber | |

(Continued)

OTHER PUBLICATIONS

Unpublished application and drawings as filed in U.S. Appl. No. 14/820,356 on Aug. 6, 2015 for "Distribution of Modular Router Configuration," (30 pages).

*Primary Examiner* — Hicham B Foud
(74) *Attorney, Agent, or Firm* — Klarquist Sparkman, LLP

(57) ABSTRACT

A method for configuring router can include identifying from a first router, neighbor routers in a router network by passing messages on the router network asking to establish a relationship with the neighbor routers. A plurality of configuration modules and associated plurality of rules including self-configuration information for configuring the first router, are received from the identified neighbor routers at the first router. A router role associated with the first router is determined. The determined router role is matched with one or more router roles associated with the plurality of configuration modules. A configuration module is selected from the plurality of configuration modules based on the matching. Using the first router, the rules associated with the selected configuration module are applied in order to self-configure the first router for use in forwarding messages through the router network.

20 Claims, 9 Drawing Sheets

(56) References Cited

U.S. PATENT DOCUMENTS

| | | |
|---|---|---|
| 2008/0062862 A1 | 3/2008 | Goyal |
| 2008/0137654 A1 | 6/2008 | Lee |
| 2009/0129398 A1 | 5/2009 | Riegel |
| 2009/0144220 A1 | 6/2009 | Feng |
| 2010/0169876 A1 | 7/2010 | Mann |
| 2010/0214913 A1 | 8/2010 | Kompella |
| 2010/0228837 A1 | 9/2010 | Squire |
| 2011/0295616 A1 | 12/2011 | Vesto |
| 2012/0198434 A1 | 8/2012 | Dirstine |
| 2012/0204167 A1 | 8/2012 | Yoshida |
| 2012/0239981 A1 | 9/2012 | Franke |
| 2013/0019236 A1 | 1/2013 | Nakagawa |
| 2013/0031223 A1 | 1/2013 | Angus |
| 2013/0058334 A1 | 3/2013 | Koponen |
| 2013/0121339 A1 | 5/2013 | Dispensa |
| 2013/0144998 A1 | 6/2013 | Squire |
| 2013/0204987 A1 | 8/2013 | Patani |
| 2013/0227519 A1 | 8/2013 | Maleport |
| 2013/0343266 A1 | 12/2013 | Hallsten |
| 2014/0108627 A1* | 4/2014 | Donley ............... H04L 61/2015 709/222 |
| 2014/0211806 A1 | 7/2014 | Basso |
| 2015/0200806 A1* | 7/2015 | Donley .................. H04L 45/58 370/392 |
| 2015/0263946 A1 | 9/2015 | Tubaltsev |
| 2015/0350154 A1* | 12/2015 | Myla .................. H04L 61/1511 709/245 |
| 2015/0381482 A1 | 12/2015 | Dispensa |
| 2016/0080249 A1 | 3/2016 | Lu |

* cited by examiner

SOFTWARE 980 IMPLEMENTING DESCRIBED TECHNOLOGIES

SELF-CONFIGURING NETWORK DEVICES

BACKGROUND

Traffic on the Internet has grown dramatically over the last decade and continues to grow. Routers play a critical role in sustaining that growth. Data to be passed by routers is generally divided into a series of packets that can be transmitted between devices. Packets include control information and payload data. The control information corresponds to information used by a communication network to deliver the payload data. For example, control information can include source and destination network addresses, error detection codes, packet sequencing identification, and the like. Typically, control information is found in packet headers and trailers included within the packet and adjacent to the payload data.

Generally, routers can operate with two primary functions or planes. The first function corresponds to a control plane, in which the router learns the set of outgoing interfaces that are most appropriate for forwarding received packets to specific destinations. The second function is a forwarding plane, in which the router sends the received packet to an outbound interface.

To execute the forwarding plane functionality, routers can maintain a forwarding information base ("FIB") that identifies, among other packet attribute information, destination information for at least a subset of possible network addresses, such as Internet Protocol ("IP") addresses. In a typical embodiment, the FIB corresponds to a table of values specifying network forwarding information for the router. To execute control plane functionality, routers can maintain a routing information base ("RIB") that identifies routes through the network. The RIB can also contain metrics associated with those routes. As the router receives route updates, the router can update the RIB with announced or withdrawn routes. Generally, where the RIB identifies available routes, the FIB identifies an output interface corresponding to a selected route and the FIB is typically generated from information in the RIB. Different protocols can be used to update the FIB and RIB. For example, an Open Shortest Path First (OSPF) routing protocol can be used, as well as other routing protocols. Generally, communications between the routers are limited to topology-based descriptions that describe the router landscape in a nearby area.

Routers currently rely on external services, or humans, to generate and apply their configurations or update their OS. However, this type of configuration leads to heavy reliance on external tools and humans, which creates scaling issues.

BRIEF DESCRIPTION OF THE DRAWINGS

FIG. 4 shows an example of a plurality of routers in a data center, wherein the routers pass configuration modules and rules there between.

DETAILED DESCRIPTION

Figure 1:
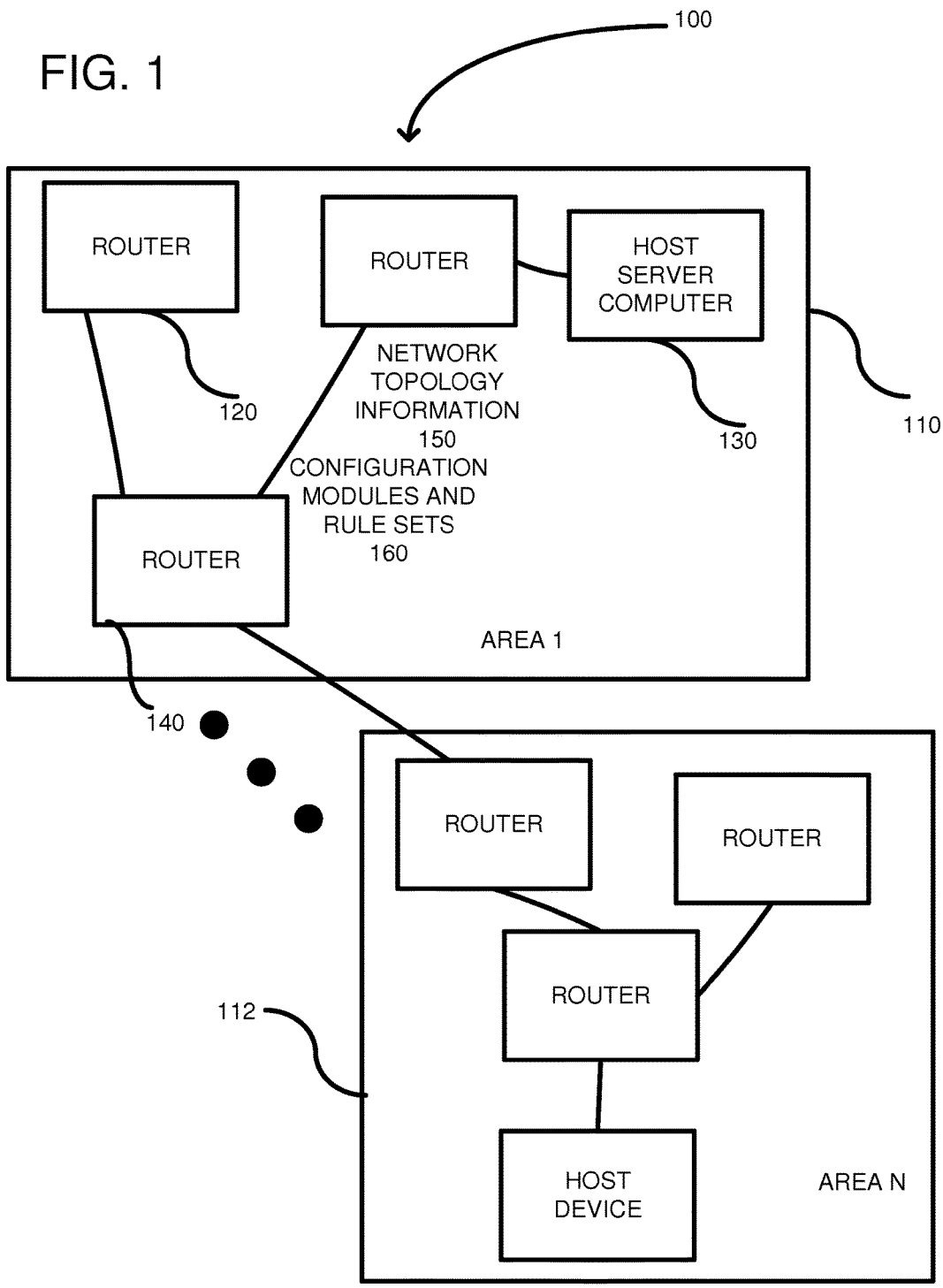
FIG. 1 shows a router network with multiple routers divided into different areas, with configuration modules and rule sets being passed between the routers.

The embodiments described herein relate to distributing configuration chunks or modules that can be processed (e.g., during self-configuration) on a router to generate a useable configuration for the router. More specifically, a configuration module and associated rules may be selected by a router based on router role. The router role may be determined by the router statically, dynamically, and/or based on a ruleset. Static determination may be based on detecting a router role from a communication received from a host or another neighboring router, or the router may determine its own type based on one or more router characteristics. Dynamic determination may take place when the router detects a new router device in the router network (or removal of a device from the network). The new device (or removal of a device) may be detected from device names within network communications received at the router. After the router role is determined, the configuration module is selected so that a router role associated with the configuration module matches the determined router role.

The configuration process used helps ensure reliable distribution of the modules and consistency within the network. After a router first boots with a default image, it attempts to form a neighborship with any neighbors on ports. After a neighborship is fully formed, the routers exchange their Module Databases (MDBs) to ensure they are both up to date. Once a router has a complete database, it parses the database to generate a configuration. If there is a difference in the configuration, the new configuration is applied and saved to storage. The MDB can be saved at an interval, such as every X updates (where X is any integer value) or every Y minutes (where Y is any value), to maintain the MDB across reboots.

The types of modules in the MDB vary depending on how far they are propagated into the network. For example, a type 0 module can be limited to the device containing it. A type 1 module can be limited to the devices in the area in which it is flagged. A type 2 module can be propagated throughout the Modular Router Configuration (MRC) domain. Other types can be defined. A network can be comprised of multiple MRC domains delineated by domain numbers. An MRC domain may have multiple areas. The modules can be redistributed between areas and MRC domains. Each module within a network can consist of a unique Module ID (MID) to prevent any looping. To prevent stale modules, each module can also have a revision number to track if this is the latest version of the module.

In particular embodiments, each area within an MRC has a Seed Device (SD) and Alternate Seed Device (ASD), similar to OSPF's Designated Router (DR) and Backup Designated Router (BDR). These devices can be responsible for maintaining consistency of the area MDB and originating updates to the area. Area Boundary Devices (ABDs) can be used to redistribute modules between areas, between MRCs, or both. For example, a first area could send a module to a second area that provides configuration parameters for BGP sessions and another module for appropriate communities to use to tag traffic.

When a first device in a network loads and has no neighbors to synchronize with yet, the device can fall back to retrieving the modules from a preconfigured host. Alternatively, the device can be loaded via an external source that detects a new device coming online. Still another alternative is to allow the device to wait until it is connected to a network of MRC domains and load a MDB.

Several embodiments described herein use the Open Shortest Path First (OSPF) routing protocol as an example, but other routing protocols can be used. For example, any interior gateway protocols (IGP) or exterior gateway protocols can be used (e.g., the Border Gateway Protocol (BGP)).

A router as described herein includes hardware and software that communicatively interconnects other equipment on the network (e.g., other network elements, end stations). Some routers provide support for multiple networking functions (e.g., routing, bridging, switching, Layer 2 aggregation, session border control, etc.), and/or provide support for multiple application services (e.g., data, voice, and video). Routers typically include a control plane and a data plane (sometimes referred to as a forwarding plane). The control plane determines how data (e.g., packets) are routed (e.g., the next hop for the data and the outgoing port for that data), and the data plane forwards the data. The control plane can include one or more routing protocols (e.g., Border Gateway Protocol (BGP), Interior Gateway Protocol(s) (IGP) (e.g., Open Shortest Path First (OSPF), Routing Information Protocol (RIP), Intermediate System to Intermediate System (IS-IS)), Label Distribution Protocol (LDP), Resource Reservation Protocol (RSVP)) that communicate with other routers to exchange routes and select those routes based on one or more routing metrics.

Routers implementing OSPF run a link state routing protocol that maintains an identical link state database (LSDB) describing the topology of the autonomous system (AS) in which it resides. Each record in the LSDB is a particular network element's usable interfaces and reachable neighbors, adjacencies, or routes external to an area or AS. Neighboring routers (or "neighbors") are two routers that have interfaces to a common network, wherein an interface is a connection between a router and one of its attached networks. Moreover, an adjacency is a relationship formed between selected neighboring routers for the purpose of exchanging routing information and abstracting the network topology. One or more router adjacencies can be established over an interface. The adjacencies are established and maintained in OSPF through the use of a "Hello" protocol. The Hello protocol ensures that communication between neighbors is bi-directional by periodically sending Hello packets out of all of the network element interfaces. Bi-directional communication is indicated when the router sees itself listed in the neighbor's Hello packet.

FIG. 1 shows a network of components 100 divided into multiple areas 110, 112. The multiple areas represent any number of N areas (where N is any integer number). Each area 110, 112 can include multiple routers, such as router 120, and multiple host server computers, such as is shown at 130. The lines between the routers represents that a full OSPF adjacency has been established. Each area 110, 112 can include groups of contiguous networks and hosts. Some routers, such as router 140, can be an area border router that connects one or more areas together. As shown at 150, through the network protocol, a router can send network topology information to an adjacent router. As shown at 160, the routers can also exchange configuration modules and rule sets. The configuration modules are part of the module databases. The routers can use the rule sets to determine whether the configuration module should be executed (i.e., loaded or used in the router). In one example, a rule can indicate that a configuration module should be executed if an adjacent router has a particular identifier. Other rules can check for flags (e.g., maintenance mode) and perform configuration based on the flag, on any parameters, characteristics or environmental parameters.

In another example, the configuration modules and/or the rulesets may be associated with a router role of router (a more detailed description of different roles of routers is provided herein below in reference to FIG. 4). A router role can be defined by the functions a router performs in a network. The router functions can change based on the relative position of the router in relation to a network component (e.g., a top-of-rack switch). In reference to FIG. 4, router roles can include, e.g., a load balancing router, a core router, an aggregation router, and a top-of-rack (TOR) switch. As an example, if a router's role is a back end load balancer (BELB), and the router detects a new BELB at a lower level, then the current router role has changed from a BELB to an aggregation router. In this regard, a configuration module and its associated rules may be used for self-configuration of a selected router based on matching the router role associated with the configuration module with the router role of the selected router.

Multiple configuration modules can be received from an adjacent router and the router 120 interprets the rules associated with the modules and can analyze the router environment, characteristics or state to determine whether to apply the configuration module. The router environment can be based on parameters associated with adjacent routers whereas the state can be related to the router at issue. Still further, the router characteristics can be based on the type of hardware or software used by the router.

Figure 2:
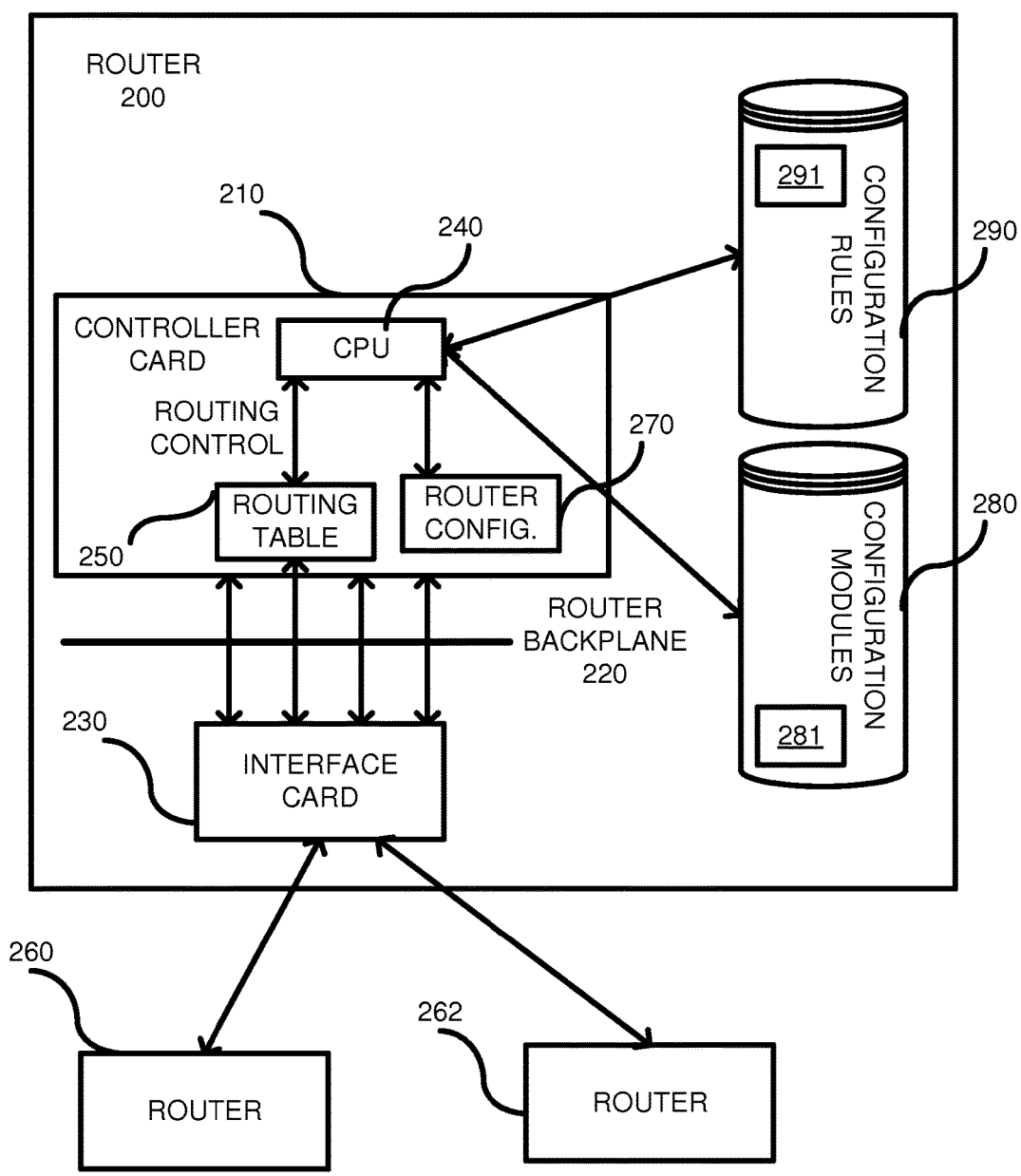
FIG. 2 shows an embodiment of a router architecture with configuration modules and rules for configuring the router.

FIG. 2 shows further details of a router architecture. A router 200 includes a controller, such as a controller card 210, a router backplane 220 and one or more interfaces, such as interface cards 230. A CPU 240 is positioned on the controller card 210 and typically performs functions such as router table maintenance, path computations, and reachability propagation. The interface cards 230 include adapters for performing inbound and outbound packet forwarding. The router backplane 220 is responsible for transferring packets between the controller card and the interface cards. The basic functionality of the router 200 can include route processing and packet forwarding. A routing table 250 allows the router to create a view of the network's topology, which describes router relationships in a network, etc. For example, the router 200 is coupled to a network of other routers, such as is shown at 260, 262 (many other routers are generally included but not shown for simplicity).

Packet forwarding generally includes IP packet validation wherein the router checks that the packet is properly formed before processing the packet. The router can then perform a table lookup to determine an output port onto which to direct the packet, and a next destination to which to send the packet. The router can also adjust a time-to-live parameter to prevent circulation of packets that are too old. Finally, the router can perform an IP header checksum.

Router table lookup in the router table 250 is typically performed by the CPU 240 using the packet's IP destination address as a key. The lookup returns the best-matching routing table entry, which provides the interface and the IP address of the packet's next hop. The next hop address can be cached in a front-end routing table (not shown), which can be organized as a hash table.

The controller card 210 can also include storage (e.g., memory, hard drive, etc.) for a router configuration 270. The router configuration is independent of the routing table 250 and does not identify best routes to take through a router network. Thus, the router configuration modules are independent of the routing topology information. Instead, the router configuration can relate to interface settings or other characteristics or properties of the router (also called environmental parameters). Example configuration settings include speed (e.g., 10 megabits per second, 100 megabits per second, Auto mode, etc.), maximum transmission units (MTU) (maximum packet size), transmission modes (e.g., full duplex, half duplex, etc.), encapsulation types, interface types, load interval (the length of time used to calculate the average load on an interface), redirect message settings (if forced to resend a packet), setting up neighbors, adjacency, configuration of routing protocols, etc.

The router configuration 270 is set by executing or using configuration modules 280. The configuration modules can be executable and each module can set configuration for a subpart of the overall router configuration settings 270. For example, one configuration module can be used to set a transmission mode, while another configuration module can set packet size, etc. The configuration modules can include an identifier (e.g., GUID) and a revision number to uniquely identify the configuration module. Configuration rules 290 can be used in conjunction with the configuration modules. Although shown separately, the configuration rules 290 can be embedded in or integrated into the configuration modules 280. For example, each configuration module can have a rule set embedded therein. The CPU can interpret the configuration rules 290 to determine whether to load the configuration modules 280 into the ultimate router configuration 270. For example, the configuration rules can require the CPU 240 to analyze current router settings or other characteristics of the router to determine whether to execute the configuration module. If the rules are satisfied, the CPU can execute and load the configuration settings into the router configuration 270. Otherwise if the rules are not satisfied, the CPU can skip the configuration module so that it is not loaded. Although a CPU is shown, as further described below, any of a variety of processors or hardware logic can be used.

In an example embodiment, the configuration modules 280 may be associated with a router role 281. For example, one or more of the configuration modules may each be associated with a router role, indicating the type of router the corresponding configuration module can be used with (e.g., for purposes of self-configuration). In some instances, the router role may also be included in the configuration rules (e.g., 291 in FIG. 2).

Figure 3:
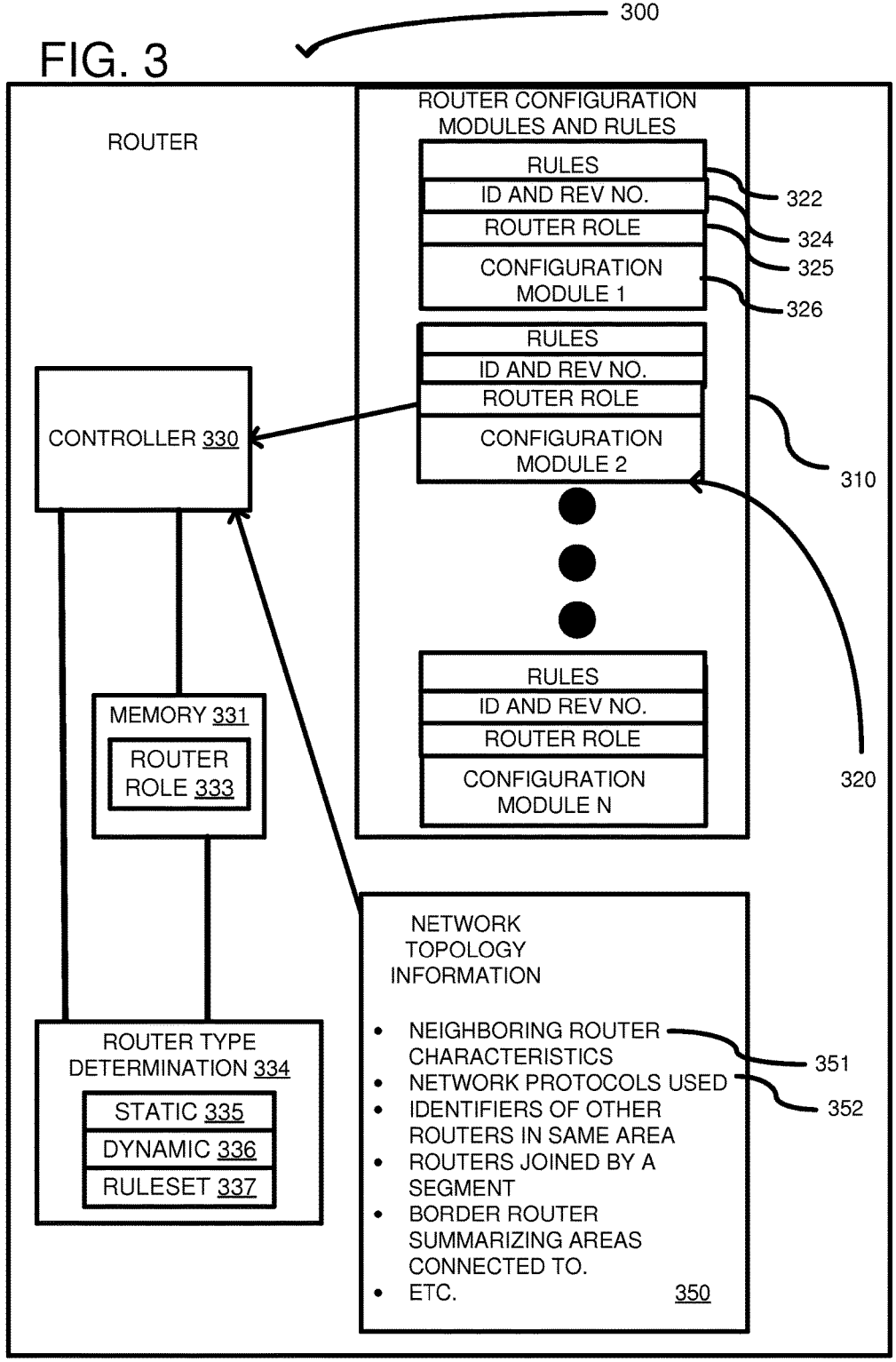
FIG. 3 shows addition details of the configuration modules.

FIG. 3 shows further details of a router 300 according to another embodiment. An integrated router configuration and rules 310 includes a plurality of configuration modules 320, each having integrated rules 322, an identifier and revision number field 324, a router role 325, and the module itself 326. The rules 322 are individualized for the associated configuration module. As shown, any number (N) of configuration modules can be used, and each can include one or more router configuration parameters or settings. A controller 330 can be a CPU, processor, or other hardware logic that is used to intelligently execute the rules and determine whether to load the configuration module based upon the rules. The controller 330 can receive the integrated router configuration and rules 310 from other routers. And the other routers can pass to the controller 330 only a portion of the N configuration modules. Even a single configuration module can be supplied from a router. Thus, the configuration modules and rules 310 can be accumulated together from a plurality of different routers. Alternatively, a master host can supply the router configuration and rules.

The router role 325 may indicate one of a plurality of router roles, which can be associated with the corresponding rules 322 and/or configuration module 326.

The router 300 may further included a memory 331 and a router role determination block 334. The memory 331 may be used to store a router role 333 associated with the router 300. The router role 333 of the router 300 may be provided by the router role determination block 334. The router role determination block 334 may comprise suitable circuitry, interfaces, logic and/or code and may be configured to determine the router role 333 statically (e.g., using the static determination block 335). The router role determination block 334 may also use the dynamic determination lock 336 to dynamically adjust/change the router role 333 and, causing an execution of rules and/or configuration module associated with the new router role. Even though blocks 334 and 331 are illustrated separately from the controller 330, the disclosure is not limited in this regard and blocks 331 and/or 334 may be fully (or partially) integrated within the controller 330.

Network topology information 350 can be separately received and can include information about the router network environment of which the router 300 is a part. The network topology information can include identifiers of other routers in the same area, routers currently joined by a segment (adjacency), border routers summarizing areas connected to, etc. The network topology information can be a link-state database (LSDB) in some protocols, such as the OSPF protocol. As previously described in relation to FIG. 2, in other embodiments the rules can be separated from the configuration modules so as to have two different databases. In an example embodiment, the network topology information 350 may also include neighboring router characteristics 351 and network protocol information 352. The neighboring router characteristics 351 may provide information on one or more routers that are communicatively coupled to the router 300, such as hardware characteristics, type of router, ports used for outgoing or incoming communications, and so forth. The network protocols information 352 may indicate the network communication protocol (or type of network traffic, such as Level 2, Level 3, etc.) used by the router 300 and/or any other router(s) communicatively coupled to router 300.

In an example operation, the static determination block 335 may statically determine the router role 333 of the router 300. For example, the static determination block 335 may detect a router role for the router 300 from a communication received from the host server 130. In another example, the static determination block 335 may detect a router role of a neighboring router (e.g., based on a communication received from a router coupled to router 300 in any of the areas 1, . . . N), and may adjust the router role 333 of the router 300 to match the router role of the neighboring router. In yet another example, the static determination block 335 may determine the router role 333 based on one or more characteristics of the router 300. The characteristics of router 300 may include hardware characteristics, communication protocol used, enabled ports, and so forth. Once the static determination block 335 determines the router role 333, the router role can be stored in memory 331. The controller 330 can then retrieve the router role 333 and parse through the router configuration modules and rules to match the router role 333 with the router role 325 associated with each of the rules 322 and/or configuration modules 326. In yet another example, the router role 333 may be statically defined and set by a user (e.g., a network administrator of the router 300 (e.g., the user sets the router role manually and stores it in memory 331)). A configuration module can be selected based on the match, and the corresponding rules can be executed to perform self-configuration of router 300.

During operation, the dynamic router role determination block 336 may dynamically adjust the router role 333, based on one or more rulesets 337. For example, the rulesets 337 may provide various rules for monitoring characteristics within the router network associated with router 300 or any other network component. For example, the ruleset 337 can be based on changes in network conditions and/or traffic (e.g., if traffic increases, then more core routers or LBs may be needed). The ruleset 337 can also be based on other conditions that can be monitored, such as device end-of-life period (e.g., when a router reaches end-of-life then it can be decommissioned automatically and router roles of remaining routers can be adjusted accordingly). The dynamic determination block 336 (using the rulesets 337) may monitor for new network devices being added (or existing network devices being removed) at network layers above or below the router 300. For example, the router 300 may be a core router in a data center, with routers below router 300 and no routers above router 300. In instances when a new router is detected above the router 300, then router 300 may need to change its type from a core router to an aggregation router.

The ruleset 337 can specify one or more rules for monitoring communications received by router 300, and detecting a network topology change from such communications. For example, the dynamic router determination block 336 may detect that a new router above router 300 is in place by receiving a "hello" message from such router. The dynamic router determination block 336 may then detect that the new router is a core router (e.g., from the new router name sent to router 300). Other ways to detect network topology change (which can trigger dynamic router role adjustment) is based on new or changed network topology information (e.g., change in information 351 and 352 within the topology information 350) and/or other communication from one or more neighboring routers (e.g., greeting message from a new router indicating new router role/type, a message from an existing router indicating a changed role/type of the existing router, a Linked Layer Discovery Protocol (LLDP) message, and so forth).

In an example embodiment, the ruleset 337 can parse through a received network message to determine one or more physical ports used by the sending router to send the message. A router role change for router 300 can be initiated based on the physical ports used by the sending router, as detected from the network communication received at the router 300. Similarly, the ruleset 337 can indicate a router role change for router 300 based on a network communication protocol (or network traffic type, such as Level 2, Level 3, etc) associated with communication received from one or more neighboring routers.

Once the router role 333 is changed dynamically, the change is recorded in memory 331, and the controller 330 can initiate a self-configuration based on the new/adjusted router role 333 (e.g., parse through the available configuration modules and rules 310 and match the corresponding router role 325 with the current router role 333 to select a rules/configuration module set for self-configuration).

Figure 4:
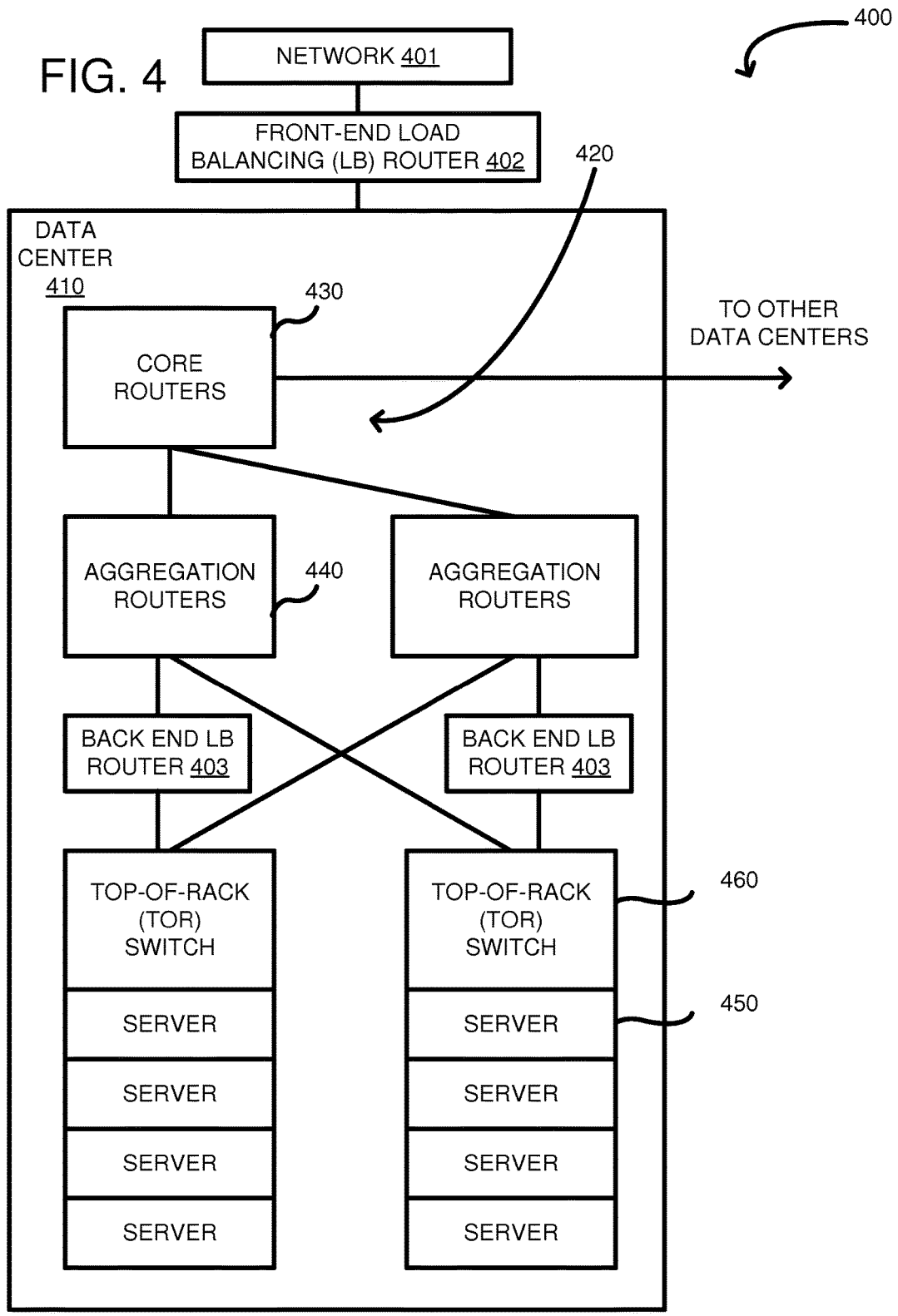

FIG. 4 illustrates an environment 400 in which the network of routers can be used. In this example, the environment 400 includes a plurality of data centers including data center 410 coupled together by routers, shown generally at 420. The data center 410 can be coupled to a border network 401 using one or more front-end load balancing (FELB) routers 402. Different levels of routers can be used. For example, core routers 430 can be coupled to other core routers in other data centers within a service provider environment. The routers 430 read address information in a received packet and determine the packet's destination. If the router decides that a different data center contains a host server computer, then the packet is forwarded to that data center. If the packet is addressed to a host in the data center 410, then it is passed to a network address translator (NAT) (not shown) that converts the packet's public IP address to a private IP address. The NAT also translates private addresses to public addresses that are bound outside of the datacenter 410. Additional aggregation routers 440 can be coupled to the NAT to route packets to one or more back-end load balancing (BELD) routers 403 that balance outgoing and incoming network traffic. The BELD routers 403 are coupled to one or more racks of host server computers 450. Each rack 450 can include a top-of-rack (TOR) switch 460 coupled to the multiple host server computers. Although one core router 430 and two aggregation routers 440 are shown, in a real data center there can be many more routers, and the routers can be grouped into areas as described herein. The core routers 430, aggregation routers 440, the load balancing routers 402/403, and/or the TOR switches 460 can pass there between configuration modules so as to configure the corresponding routers.

Figure 5:
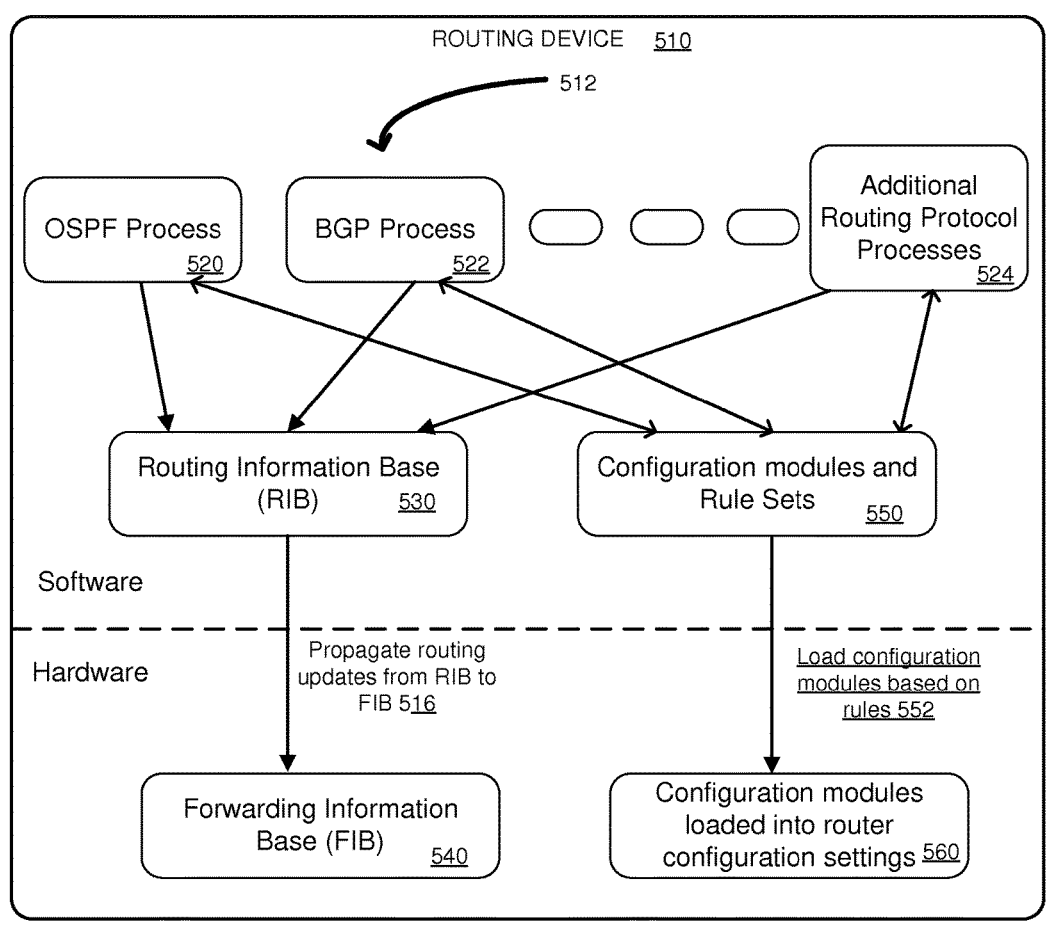
FIG. 5 is an embodiment of a routing device with a division between software and hardware illustrated.

FIG. 5 is a diagram depicting am example routing device 510 configured to apply routing updates that include routing information and configuration settings. As depicted at 512, the routing device 510 supports one or more routing protocols that have been extended to support receiving configuration modules and/or rule sets. The routing protocols that are extended can include OSPF, BGP, and/or other routing protocols.

The routing device 510 receives routing updates and handles them according to the network protocol associated with the routing update. For example, an OSPF process 520 can be provided to handle OSPF routing updates, a BGP process 522 can be provided to handle BGP routing updates, and/or other routing protocol processes 524 can be provided to handle routing updates according to other routing protocols. In this example, the routing protocols 512 are extended not only to receive routing table updates but also configuration settings for the routing device 510 itself.

If a routing table update is applied by the routing device 510, the routing update is added to a RIB 530 of the routing device 510. For example, the routing device 510 can first examine the routing update and determine if the routing update will affect any of the routes maintained by the routing device 510. If the routing update will affect one or more routes maintained by the routing device, the routing update can be added to the RIB 530.

Routing updates are stored in the RIB 530 in preparation for putting them into effect by propagating them to the FIB 540. When a routing update is received according to a routing protocol, the routing update can be held in the RIB 530 until it is to be applied, at which time it can be propagated from the RIB 530 to the FIB 540.

In some implementations, the routing device 510 performs routing protocol processing and stores the RIB 530 in software. The routing device 510 then puts routing updates into effect by propagating routing updates from the RIB 530 located in software to the FIB 540 located in hardware, as indicated at 516. Other implementations may use different arrangements (e.g., a RIB and FIB implemented in software).

In some implementations, applying routing updates by the routing device 510 allows for one or more IP prefixes and/or other routing information to be tagged such that the information is not passed from the RIB 530 to the FIB 540 until a specific time threshold has been reached (e.g., according to the synchronous mode or the decay mode). Upper layer routing calculations can be performed as normal, with only the RIB to FIB update process delayed until the update time is reached.

The routing protocols can be further extended to handle receiving configuration modules and rule sets 550 that can be passed to the routing device 510 using the same protocols 512 (with newly extended functionality) used to pass the routing information stored in the RIB 530. The configuration modules and rule sets 550 can be integrated or separated as previously described. Depending on the interpretation of the rules, selected configuration modules that satisfy the rules can be loaded, as shown at 552, from software into hardware settings 560 for the routing device 510. The configuration settings 560 can be stored in memory and used to configure the routing device 510 itself, as opposed to the FIB that describes where to forward packets. The processes, such as the OSPF process 520 can read the configuration modules currently present and apply updates based on the configuration modules.

Figure 6:
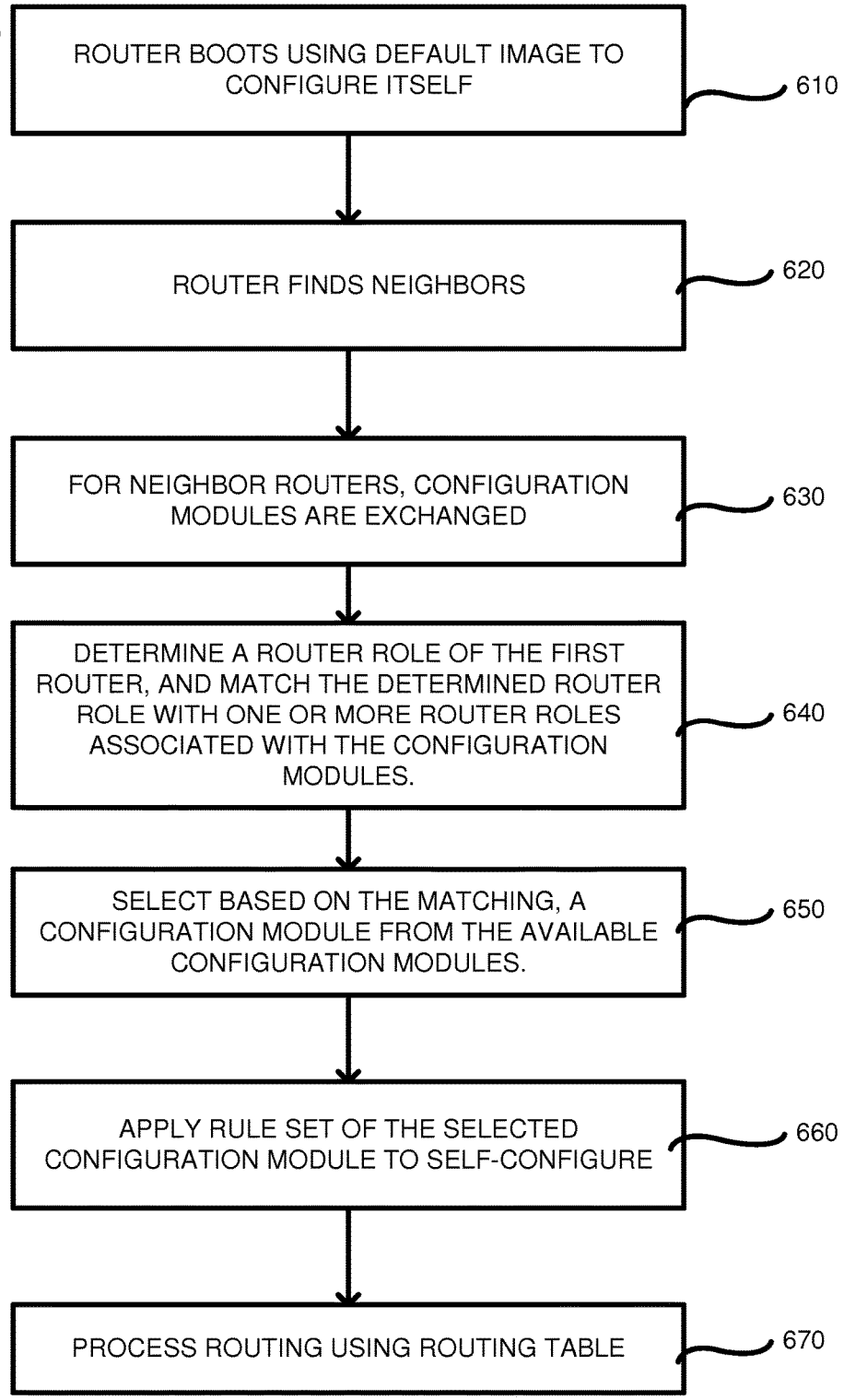
FIG. 6 is a flowchart of a method for configuring a router.

FIG. 6 is a flowchart of a method for configuring a router. In process block 610, a router boots up using a default image to configure itself. Such a booting process can include performing a power-on self-test and loading a bootstrap program. Next, the operating system can be located and loaded. A startup configuration file can be loaded from NVRAM, a TFTP server or a console. The configuration file includes previously saved configuration parameters and commands, including interface addresses, routing information, passwords and other configuration parameters. In process block 620, the router can find neighbors. Different protocols have different messages for establishing neighbors. For example, OSPF uses a "hello" message to allow a router to discover adjacent routers on its local links and networks. Other messages can be used depending on the protocol. In process block 630, for neighbor routers, configuration modules are exchanged. For exchanging data, the adjacent routers can set up a master/servant relationship. Communicating the configuration modules can also include communicating rules associated with the configuration modules. Several messages may have to be sent by the sending device designated as the master device with the servant device responding with acknowledgements. In process block 640, the configuration modules can be parsed to determine a router role of the first router, and match the determined router role with one or more router roles associated with the configuration modules. For example, the router role field 325 can be parsed from the configuration modules 310.

In process block 650, the router role 325 can be compared to the router role 333 determined (statically or dynamically) by the controller 330. If the router roles match, then the configuration module associated with the router role 333 is selected based on the matching. In process block 660, after the configuration module is selected based on the matching, the ruleset of the selected module is applied. If the rules are satisfied, the matched configuration module is run. Running the configuration means that the configuration can be running in RAM on the router. The configuration determines how the router operates on the network. In process block 670, after having configured the router, it can continue with its normal operation of processing routing (e.g., forwarding packets) using the routing table.

Figure 7:
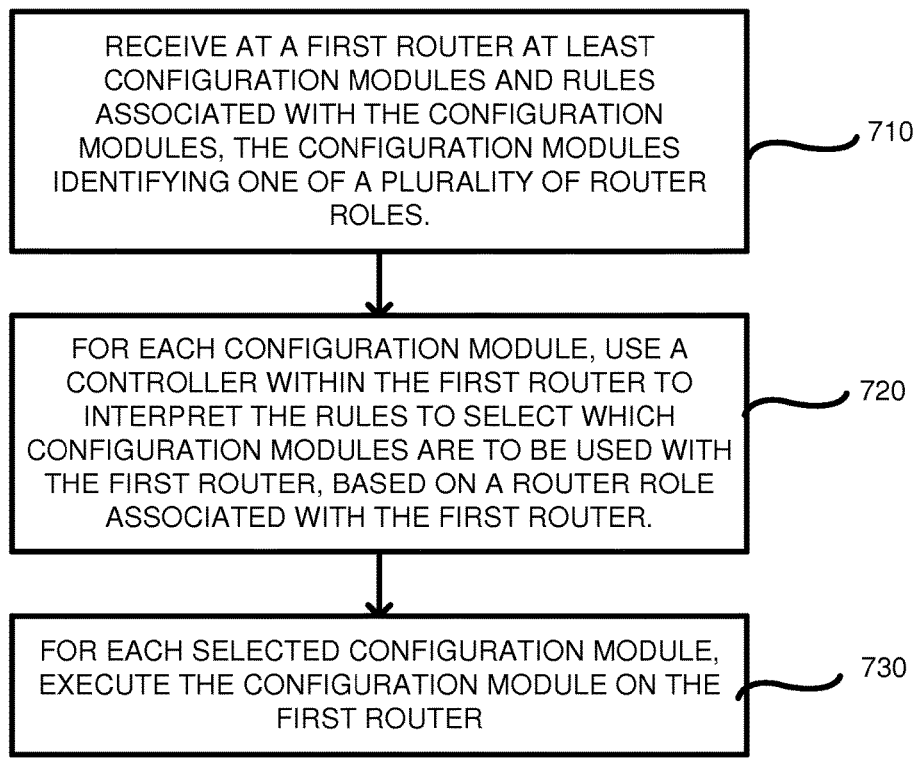
FIG. 7 is a flowchart of a method according to another embodiment for configuring a router.

FIG. 7 is a flowchart according to another embodiment for configuring a router. In process block 710, a first router receives at least configuration modules and rules associated with the configuration modules. The configuration modules can include executable code and/or settings for the router, and can identify one of a plurality of router roles associated with the corresponding ruleset and configuration module (e.g., 325). Receiving the configuration is typically accomplished through messages with neighbor routers. Alternatively, a master host server computer can oversee the routers in a network of routers to ensure that all routers in an area share the same configuration modules and rules. Each configuration module is typically a subpart of the overall configuration of the router and a plurality of the configuration modules are combined to obtain the overall configuration. For example, a configuration module can be a single setting or a combination of settings. In process block 720, a controller is used to interpret the rules for each configuration module to select which configuration modules are to be used with the first router, by matching the router role (333) associated with the first router (e.g., 300) with the router role (325) associated with each of the router configuration modules and rules 310. Selecting a configuration module is accomplished when the router role 333 matches the router role 325, and the rules associated with the configuration module are satisfied. For example, the rules can be based on current settings of the router or other environmental factors (type of router, what other routers it is connected to, etc.). In process block 730, for each selected configuration module, the configuration module is executed on the first router, meaning that any settings are loaded in the first router. For example, the settings can be stored in RAM in a configuration area.

The router network can be divided into areas, as is known in OSPF protocols. The configuration modules can be transmitted to each router in a given area by master/servant transmissions between routers in that area. In this way, all routers in the area can share the same configuration modules and rules. The configuration rules can have time-based information in them, such as when to load the configuration modules. In this way, each router can have synchronized configuration modules loaded so as to self-configure at a predetermined time. In some embodiments, the rules can also have a second time at which the configuration is returned to a previous configuration. Using multiple times allows the router to automatically switch configuration for high-traffic periods and then switch back to a low-traffic mode after the period passes. Another example of how the configuration can be modified includes changing of a hashing algorithm used for routing packets.

Figure 8:
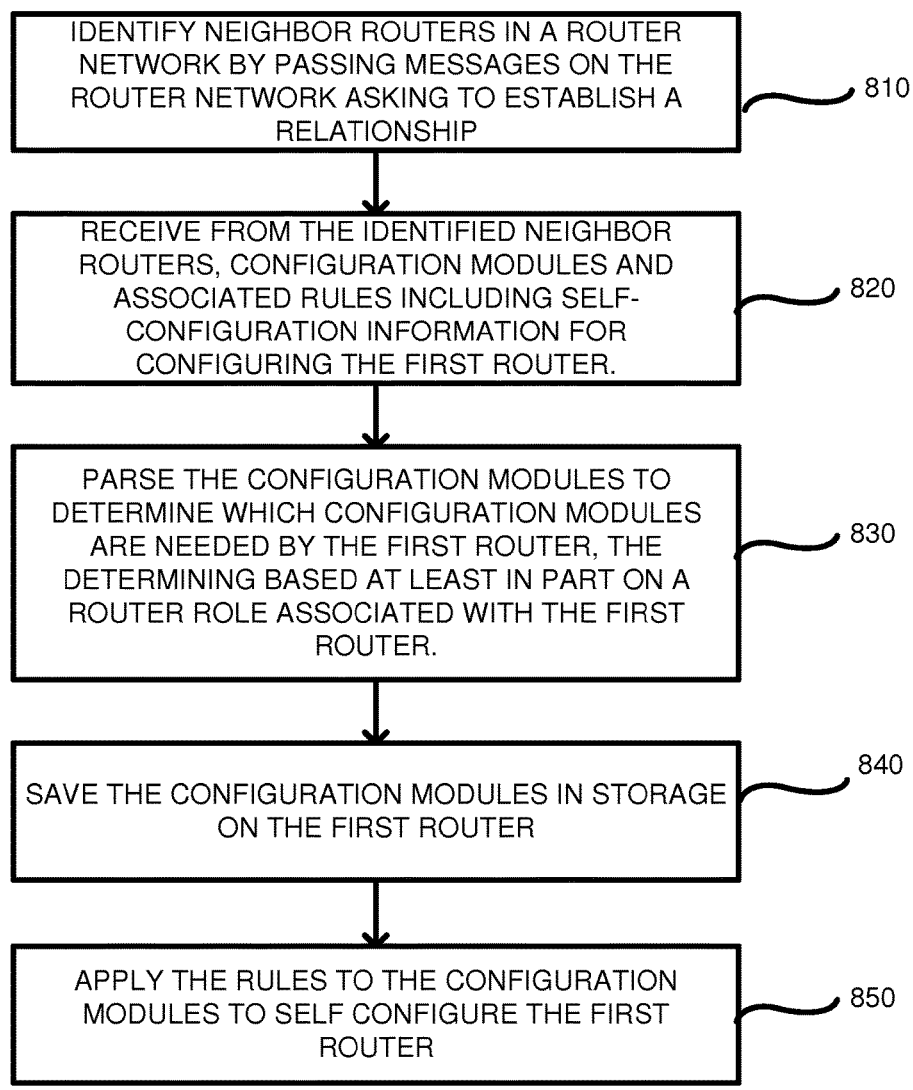
FIG. 8 is a flowchart of a method according to yet another embodiment for configuring a router.

FIG. 8 is a flowchart according to another embodiment for configuring a router. In process block 810, neighbor routers in a router network can be identified by passing messages (e.g., hello messages in OSPF) to other routers to establish a relationship. Identifying can also be accomplished in other ways, such as having neighbor routers statically defined, such as is accomplished using BGP. In process block 820, for identified neighbors for which a relationship is established, configuration modules can be received including self-configuration information for configuring the router. In process block 830, the configuration modules can be parsed by dividing the fields of the configuration modules so as to extract an identifier of the configuration module. The identifier can be used to determine whether the configuration module is needed or is already stored on the router. Additionally, the configuration modules can be parsed to determine a router role (325) associated with each available configuration module. The router role 325 can be compared with the router role (333) of a router in order to select a configuration module and a ruleset for self-configuration of the router. In process block 840, the configuration modules can be saved in storage of the router, such as in RAM, for cases where the configuration module is needed. The router can choose to only save configuration modules that are different than existing configuration modules, which can be accomplished by comparing the identifier of the configuration module with identifiers of existing configuration modules. In process block 850, rules can be applied to the configuration modules to self-configure the router.

Figure 9:
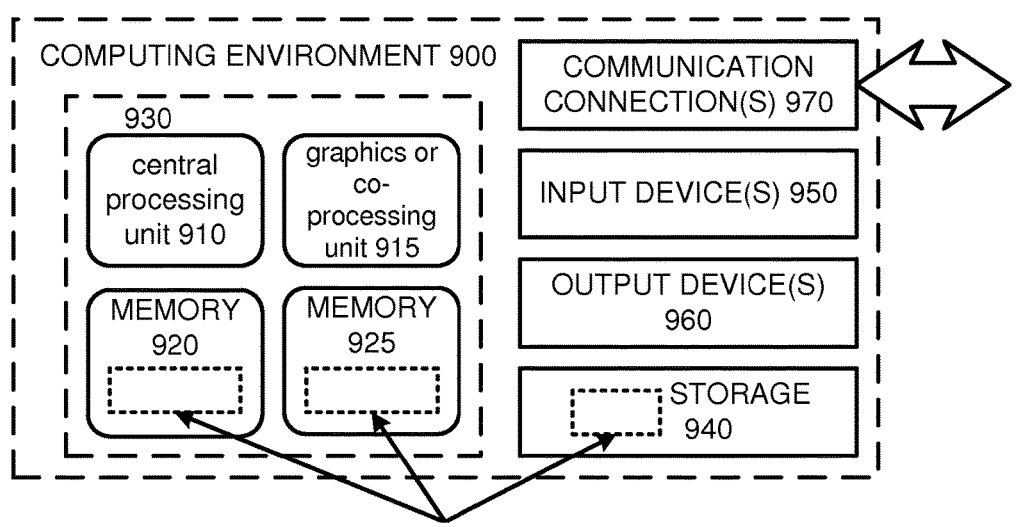
FIG. 9 depicts a generalized example of a suitable computing environment in which the described innovations may be implemented.

FIG. 9 depicts a generalized example of a suitable computing environment 900 in which the described innovations may be implemented. The computing environment 900 is not intended to suggest any limitation as to scope of use or functionality, as the innovations may be implemented in diverse general-purpose or special-purpose computing systems. For example, the computing environment 900 can be any of a variety of computing devices including a router.

With reference to FIG. 9, the computing environment 900 includes one or more processing units 910, 915 and memory 920, 925. In FIG. 9, this basic configuration 930 is included within a dashed line. The processing units 910, 915 execute computer-executable instructions. A processing unit can be a general-purpose central processing unit (CPU), processor in an application-specific integrated circuit (ASIC) or any other type of processor. In a multi-processing system, multiple processing units execute computer-executable instructions to increase processing power. For example, FIG. 9 shows a central processing unit 910 as well as a graphics processing unit or co-processing unit 915. The tangible memory 920, 925 may be volatile memory (e.g., registers, cache, RAM), non-volatile memory (e.g., ROM, EEPROM, flash memory, etc.), or some combination of the two, accessible by the processing unit(s). The memory 920, 925 stores software 980 implementing one or more innovations described herein, in the form of computer-executable instructions suitable for execution by the processing unit(s).

A computing system may have additional features. For example, the computing environment 900 includes storage 940, one or more input devices 950, one or more output devices 960, and one or more communication connections 970. An interconnection mechanism (not shown) such as a bus, controller, or network interconnects the components of the computing environment 900. Typically, operating system software (not shown) provides an operating environment for other software executing in the computing environment 900, and coordinates activities of the components of the computing environment 900.

The tangible storage 940 may be removable or non-removable, and includes magnetic disks, magnetic tapes or cassettes, CD-ROMs, DVDs, or any other medium which can be used to store information in a non-transitory way and which can be accessed within the computing environment 900. The storage 940 stores instructions for the software 980 implementing one or more innovations described herein.

The input device(s) 950 may be a touch input device such as a keyboard, mouse, pen, or trackball, a voice input device, a scanning device, or another device that provides input to the computing environment 900. The output device(s) 960 may be a display, printer, speaker, CD-writer, or another device that provides output from the computing environment 900.

The communication connection(s) 970 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions stored on one or more computer-readable storage media (e.g., one or more optical media discs, volatile memory components (such as DRAM or SRAM), or non-volatile memory components (such as flash memory or hard drives)) and executed on a computer (e.g., any commercially available computer, including smart phones or other mobile devices that include computing hardware). The term computer-readable storage media does not include communication connections, such as signals and carrier waves. Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Perl, JavaScript, Adobe Flash, or any other suitable programming language. Likewise, the disclosed technology is not limited to any particular computer or type of hardware. Certain details of suitable computers and hardware are well known and need not be set forth in detail in this disclosure.

It should also be well understood that any functionality described herein can be performed, at least in part, by one or more hardware logic components, instead of software. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and subcombinations with one another. The disclosed methods, apparatus, and systems are not limited to any specific aspect or feature or combination thereof, nor do the disclosed embodiments require that any one or more specific advantages be present or problems be solved.

In view of the many possible embodiments to which the principles of the disclosed invention may be applied, it should be recognized that the illustrated embodiments are only examples of the invention and should not be taken as limiting the scope of the invention. Rather, the scope of the invention is defined by the following claims. We therefore claim as our invention all that comes within the scope of these claims.

What is claimed is:

1. A method of configuring a router, the method comprising:
   from a first router, identifying neighbor routers in a router network by passing messages on the router network asking to establish a relationship with the neighbor routers;
   receiving, from the identified neighbor routers and using the first router, configuration modules and associated respective rules, the configuration modules including self-configuration information for configuring the first router, and the self-configuration information including a transmission rate;
   determining a router role for the first router, the router role defined by one or more functions the first router performs in the router network;
   using the first router, matching the determined router role with one or more router roles associated with the configuration modules;
   using the first router, selecting, based on the matching, one of the configuration modules; and
   using the first router, applying the rules associated with the selected configuration module in order to self-configure the first router for use in forwarding messages through the router network.

2. The method of claim 1, further comprising:
   determining the router role statically, based on at least one of the following:
   a communication from a host server of the router network;
   a communication from one or more of the neighbor routers;
   a user-defined router role;
   at least one characteristic of the first router; or
   at least one characteristic of a router communicating with the first router.

3. The method of claim 1, further comprising:
   determining the router role dynamically, based on at least one of the following:
   a change in a number of routers in the router network;
   a change in a routing protocol used by network traffic associated with the first router;
   a ruleset associated with one or more network conditions in the router network; or
   a hardware end-of-life period determination.

4. The method of claim 1, wherein the router role is one of:
   a core router role;
   an aggregation router role;
   a load balancing router role; or
   a top-of-rack (TOR) router role.

5. The method of claim 1, wherein the associated rules are embedded within the configuration modules, and the associated rules direct whether to use the configuration modules on the first router if characteristics of the first router are met.

6. A computer-readable storage medium including instructions that upon execution cause a computer system to:
   from a first router in a network of routers, establish communications with at least a second router on the network of routers;
   receive, at the first router, executable configuration modules and rules associated with the configuration modules from the second router through an interface on the first router, the configuration modules identifying one of a plurality of router roles and including self-configuration information for configuring the first router, the self-configuration information including a transmission rate;
   use a controller within the first router to interpret the rules and select which of the configuration modules are to be used with the first router based on a router role of the first router; and
   for each selected configuration module, execute the selected configuration module on the first router.

7. The computer-readable storage medium according to claim 6, wherein the instructions, upon execution, further cause the computer system to:
   use the controller within the first router to determine the router role of the first router.

8. The computer-readable storage medium according to claim 7, wherein the instructions, upon execution, further cause the computer system to:
   determine the router role of the first router using static router role determination or dynamic router role determination.

9. The computer-readable storage medium according to claim 8, wherein during the static router determination, the instructions, upon execution, further cause the computer system to:
   detect a router role of a neighboring router in the network of routers, based on a communication received by the first router from the neighboring router; and
   determine the router role of the first router to be the same as the router role of the neighboring router.

10. The computer-readable storage medium according to claim 8, wherein during the static router determination, the instructions, upon execution, further cause the computer system to:
    determine at least one hardware characteristic of the first router; and
    determine the router role of the first router based on the at least one hardware characteristic.

11. The computer-readable storage medium according to claim 8, wherein during the dynamic router determination, the instructions, upon execution, further cause the computer system to:
    use the controller within the first router to detect at least one of the following:
        a change in a number of routers in the router network;
        a change in a routing protocol used by network traffic associated with the first router;
        a ruleset associated with one or more network conditions in the router network; or
        a hardware end-of-life period determination.

12. The computer-readable storage medium according to claim 11, wherein during the dynamic router determination, the instructions, upon execution, further cause the computer system to:
    change the router role of the first router to another router role based on the detected change in the number of routers or the change in the routing protocol.

13. The computer-readable storage medium according to claim 11, wherein the instructions, upon execution, further cause the computer system to:
    retrieve the router role of the first router from a memory location within the first router.

14. The computer-readable storage medium according to claim 6, wherein the router role is one of:
    a core router role;
    an aggregation router role;
    a load balancing router role; or
    a top-of-rack (TOR) router role.

15. A system, comprising:
    first and second routers in a router network, the first and second routers each including a controller, an interface, and a module database, the module databases comprising configuration rules and configuration modules, the configuration modules comprising instructions to configure a router in accordance with the configuration rules and based on a router role associated with the router, and the configuration modules further comprising self-configuration information for configuring the router, the self-configuration information including a transmission rate; and
    a computer-readable storage medium including instructions that upon execution cause the controller of the first router to:
        exchange module databases with the second router;
        select which of the configuration modules in the module database received from the second router are to be used with the first router based at least in part on the router role associated with the first router; and
        execute the selected configuration module(s) in order to self-configure the first router for use in forwarding messages through the router network.

16. The system of claim 15, wherein the controller of the first router is further configured to:
    detect a router role associated with the second router; and
    adjust the router role associated with the first router to be the same as the router role associated with the second router.

17. The system of claim 16, wherein the controller of the first router is further configured to:
    select one of the configuration modules received from the second router based on the adjusted router role; and
    configure the first router based on the selected configuration module.

18. The system of claim 15, wherein the first router and the second router are within a data center, and wherein all routers in the router network share the configuration rules and configuration modules.

19. The system of claim 15, wherein the controllers comprise respective controller cards and the interfaces comprise respective interface cards.

20. The system of claim 15, wherein the configuration modules are executable and comprise respective identifiers and revision numbers.

* * * * *